United States Patent
Xiaocheng et al.

(10) Patent No.: US 8,683,487 B2
(45) Date of Patent: *Mar. 25, 2014

(54) LANGUAGE LEVEL SUPPORT FOR SHARED VIRTUAL MEMORY

(71) Applicants: Intel Corporation, Santa Clara, CA (US); Kerry Tweet, Hillsboro, OR (US)

(72) Inventors: Zhou Xiaocheng, Beijing (CN); Shoumeng Yan, Beijing (CN); Gao Ying, Beijing (CN); Hu Chen, Beijing (CN); Peinan Zhang, Beijing (CN); Mohan Rajagopalan, Mountain View, CA (US); Avi Mendelson, Haifa (IL); Bratin Saha, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,427

(22) Filed: Mar. 11, 2013

(65) Prior Publication Data

US 2013/0187936 A1    Jul. 25, 2013

Related U.S. Application Data

(63) Continuation of application No. 12/317,854, filed on Dec. 30, 2008, now Pat. No. 8,397,241.

(60) Provisional application No. 61/199,095, filed on Nov. 13, 2008.

(51) Int. Cl.
*G06F 9/44* (2006.01)
*G06F 13/14* (2006.01)
*G06F 13/00* (2006.01)

(52) U.S. Cl.
USPC .......... 719/312; 719/328; 719/330; 711/147; 345/520

(58) Field of Classification Search
None
See application file for complete search history.

(56) References Cited

U.S. PATENT DOCUMENTS

| | | | |
|---|---|---|---|
| 7,075,541 B2 | 7/2006 | Diard | |
| 7,231,632 B2 | 6/2007 | Harper | |
| 7,248,265 B2 | 7/2007 | Zimmer | |
| 7,355,601 B2 | 4/2008 | Andrews | |
| 7,489,318 B1 | 2/2009 | Wilt | |
| 7,598,953 B2 | 10/2009 | Tarditi, Jr. | |
| 7,769,979 B1 | 8/2010 | Glasco | |
| 7,928,990 B2 | 4/2011 | Jiao | |
| 8,077,181 B2 | 12/2011 | Diard | |
| 8,095,735 B2 | 1/2012 | Brewer | |
| 8,102,391 B2 | 1/2012 | Fowler | |
| 8,122,229 B2 | 2/2012 | Wallach | |
| 2006/0164425 A1 | 7/2006 | Parke | |
| 2008/0030510 A1 | 2/2008 | Wan | |
| 2008/0109795 A1 | 5/2008 | Buck | |

*Primary Examiner* — Van Nguyen
(74) *Attorney, Agent, or Firm* — Trop, Pruner & Hu, P.C.

(57) ABSTRACT

Embodiments of the invention provide language support for CPU-GPU platforms. In one embodiment, code can be flexibly executed on both the CPU and GPU. CPU code can offload a kernel to the GPU. That kernel may in turn call preexisting libraries on the CPU, or make other calls into CPU functions. This allows an application to be built without requiring the entire call chain to be recompiled. Additionally, in one embodiment data may be shared seamlessly between CPU and GPU. This includes sharing objects that may have virtual functions. Embodiments thus ensure the right virtual function gets invoked on the CPU or the GPU if a virtual function is called by either the CPU or GPU.

27 Claims, 7 Drawing Sheets

LANGUAGE LEVEL SUPPORT FOR SHARED VIRTUAL MEMORY

RELATED APPLICATION

This application is a continuation of U.S. patent application Ser. No. 12/317,854, filed on Dec. 30, 2008, which issued as U.S. Pat. No. 8,397,241, which claims the benefit of provisional Patent Application No. 61/199,095, filed on Nov. 13, 2008, entitled "Shared Virtual Memory." This application is also related to U.S. patent application Ser. No. unknown, filed on Dec. 30, 2008, entitled "Shared Virtual Memory."

BACKGROUND

This relates generally to shared virtual memory implementations and in particular to fine-grain partitioning between a CPU and a GPU.

The computing industry is moving towards a heterogeneous platform architecture consisting of a general purpose CPU along with programmable GPUs attached both as a discrete or integrated device. These CPUs are connected over both coherent and non-coherent interconnects, have different industry standard architectures (ISAs) and may use their own operating systems.

Computing platforms composed of a combination of a general purpose processor (CPU) and a graphics processor (GPU) have become ubiquitous, especially in the client computing space. Today, almost all desktop and notebook platforms ship with one or more CPUs along with an integrated or a discrete CPU. For example, some platforms have a processor paired with an integrated graphics chipset, while the remaining use a discrete graphics processor connected over an interface, such as PCI-Express. Some platforms ship as a combination of a CPU and a GPU. For example, some of these include a more integrated CPU-GPU platform while others include a discrete graphics processor to complement integrated CPU offerings.

These CPU-GPU platforms may provide significant performance boost on non-graphics workloads in image processing, medical imaging, data mining, and other domains. The massively data parallel GPU may be used for getting high throughput on the highly parallel portions of the code.

Existing language mechanisms for executing applications on a CPU-GPU platform tend to only support an offload model in which a kernel (function) is offloaded to the GPU. The arguments to the function are copied to the device. If the arguments include pointer-containing data structures, then the arguments are marshaled and passed to the GPU. Similarly the return value is copied back to the CPU.

These existing models (also referred hereafter as the device models) have a number of disadvantages: 1) they prevent a natural partitioning of an application between the CPU and GPU. An application usually has some throughput oriented parts and some scalar parts. For example a game application will have rendering that is suited for the GPU, but will also have physics and AI that is suited for the CPU. Current models tend to force most of the computation to be offloaded to the GPU.

DETAILED DESCRIPTION

Embodiments of the invention provide language support for CPU-GPU platforms. In one embodiment, code can be flexibly executed on both the CPU and GPU. CPU code can offload a kernel to the GPU. That kernel may in turn call preexisting libraries on the CPU, or make other calls into CPU functions. This allows an application to be built without requiring the entire call chain to be recompiled. Additionally, in one embodiment data may be shared seamlessly between CPU and GPU. This includes sharing objects that may have virtual functions. Embodiments thus ensure the right function gets invoked on the CPU or the GPU if a virtual function is called on a shared object by either the CPU or GPU.

The GPGPU environment may be made more versatile by sharing memory between the CPU and GPU and seamless execution of code on a CPU-GPU platform as described herein. For purposes of explanation, we will assume the existence of a keyword "shared" that may be used to denote variables that are shared between the CPU and GPU—i.e. have the same virtual address in both CPU and GPU.

In particular, embodiments of the invention provide a uniform programming model for both integrated and discrete devices. The model also works uniformly for multiple GPU cards and hybrid GPU systems (discrete and integrated). This allows software vendors to write a single application stack and target it to all the different platforms. Additionally, embodiments of the invention provide a shared memory model between the CPU and GPU. Instead of sharing the entire virtual address space, only a part of the virtual address space needs to be shared. This allows efficient implementation in both discrete and integrated settings. Furthermore, language annotations may be used to demarcate code that must run on the GPU, and also CPU code that can be invoked from the GPU. Language support may be extended to include features such as function pointers.

Embodiments of the shared memory model provide a novel programming paradigm. In particular, data structures may be seamlessly shared between the CPU and GPU, and pointers may be passed from one side to the other without requiring any marshalling. For example, in one embodiment a game engine may includes physics, artificial intelligence (AI), and rendering. The physics and AI code may be best executed on the CPU, while the rendering may be best executed on the GPU. Data structures may need to be shared, such as the scene graph, between the CPU & GPU. Such an execution model may not be possible in some current programming environments since the scene graph would have to be serialized (or marshaled) back and forth. However, in embodiments of the shared memory model, the scene graph may simply reside in shared memory and be accessed both by the CPU and GPU.

In one embodiment, the full programming environment, including the language and runtime support, is implemented. A number of highly parallel non-graphics workloads may be ported to this environment. The implementation may work on heterogeneous operating systems, i.e. with different operating systems running on the CPU and GPU. Moreover, user level communication may be allowed between the CPU and GPU. This may make the application stack more efficient since the overhead of the OS driver stack in CPU-GPU communication may be eliminated. The programming environment may be ported to two different heterogeneous CPU-GPU platform simulators—one simulates the CPU attached as a discrete device to the CPU, while the other simulates an integrated CPU-GPU platform.

In summary, embodiments of the programming model for CPU-GPU platforms may:
  Provide a uniform programming model for discrete, integrated, multi-GPU cards and hybrid GPU configurations.
  Provide shared memory semantics between the CPU and GPU allowing pointers to be passed and data structures to be shared freely between the CPU and GPU
  Be implemented in a heterogeneous CPU-GPU platform with different ISAs and different operating systems on the CPU and GPU.
  Enable user-level communication between the CPU and GPU thus making the application stack much more efficient.

Memory Model

Figure 1:
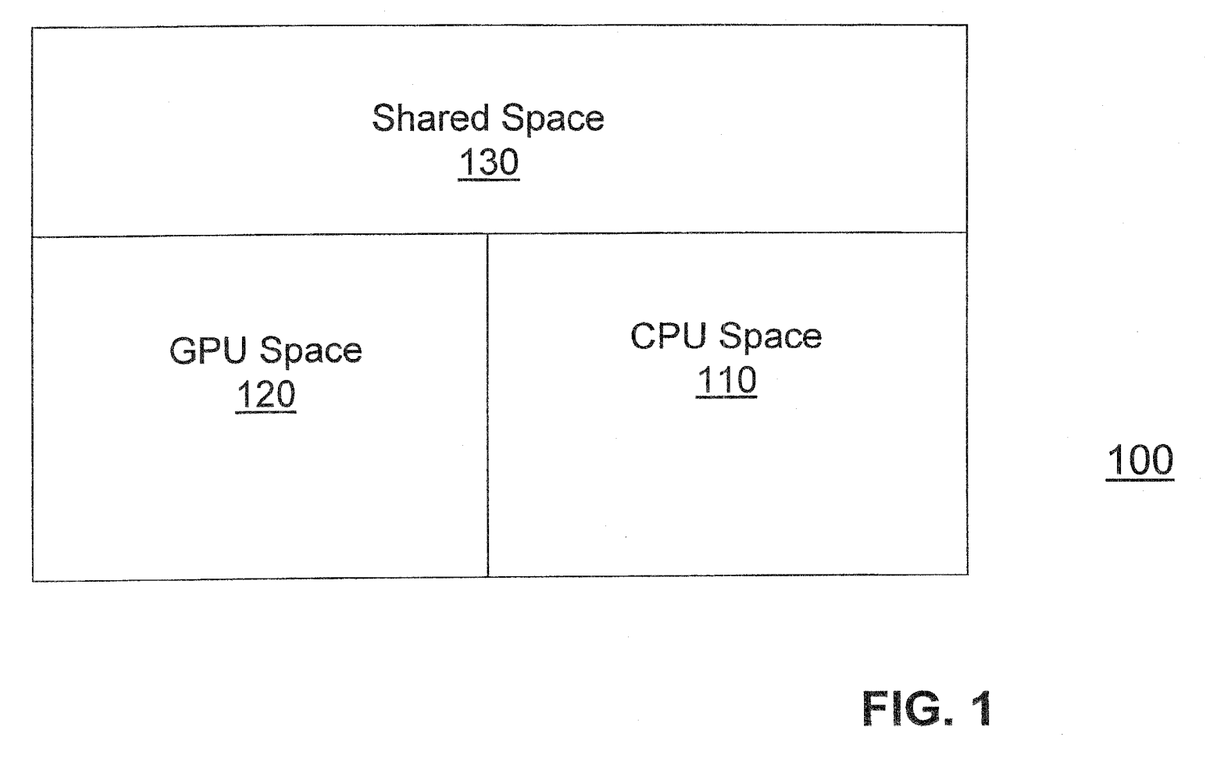
FIG. 1 is a depiction of a CPU-GPU memory model in accordance with one embodiment.

FIG. 1 is a depiction of a GPU-CPU memory model in accordance with one embodiment. In one embodiment, the memory model 100 provides a window of shared virtual addresses 130 between the CPU 110 and GPU 120, such as in partitioned global address space (PGAS) languages. Any data structure that is shared between the CPU 110 and GPU 120 typically must be allocated by the programmer in this space 130. The system may provide a special malloc function that allocates data in this space 130. Static variables may be annotated with a type quantifier to have them allocated in the shared window 130. However, unlike PGAS languages there is no notion of affinity in the shared window. This is because data in the shared space 130 migrates between the CPU and GPU caches as it gets used by each processor. Also unlike PGAS implementations, the representation of pointers does not change between the shared and private spaces. The remaining virtual address space is private to the CPU 110 and GPU 120. By default data gets allocated in this space, and is not visible to the other side. This partitioned address space approach may cut down on the amount of memory that needs to be kept coherent and enables a more efficient implementation for discrete devices.

The embodiment of the memory model may be extended to multi-GPU and hybrid configurations. In particular, the window of shared virtual addresses may be extended across all the devices. Any data structures allocated in this shared address window 130 may be visible to all agents and pointers in this space may be freely exchanged. In addition, every agent has its own private memory.

Language Constructs

In one embodiment, to address platform heterogeneity, constructs may be added to C/C++ that allow the programmer to specify whether a particular data item should be shared or private, and to specify whether a particular code chunk should be run on the CPU or GPU.

The first construct may be a shared type qualifier which specifies a variable that is shared between the CPU & GPU. The qualifier may also be associated with pointer types to imply that the target of the pointer is in shared space. In one embodiment, this may be implemented as:

| | |
|---|---|
| shared int var1; | // int is in shared space |
| int var2; | // int is not in shared space |
| shared int* ptr1; | // ptr1 points to a shared location |
| int* ptr2; | // ptr2 points to private space |
| shared int *shared ptr1; | // ptr1 points to shared and is shared |

In one embodiment, the programmer tags all data that is shared between the CPU and GPU with the shared keyword. The compiler allocates global shared variables in the shared memory space, while the system provides a special malloc function to allocate data in the shared memory. The actual virtual address range in each space may be decided by the system and may be transparent to the user. Variables with automatic storage (e.g. stack allocated variables) are not allowed to be marked with the keyword shared.

Figure 2:
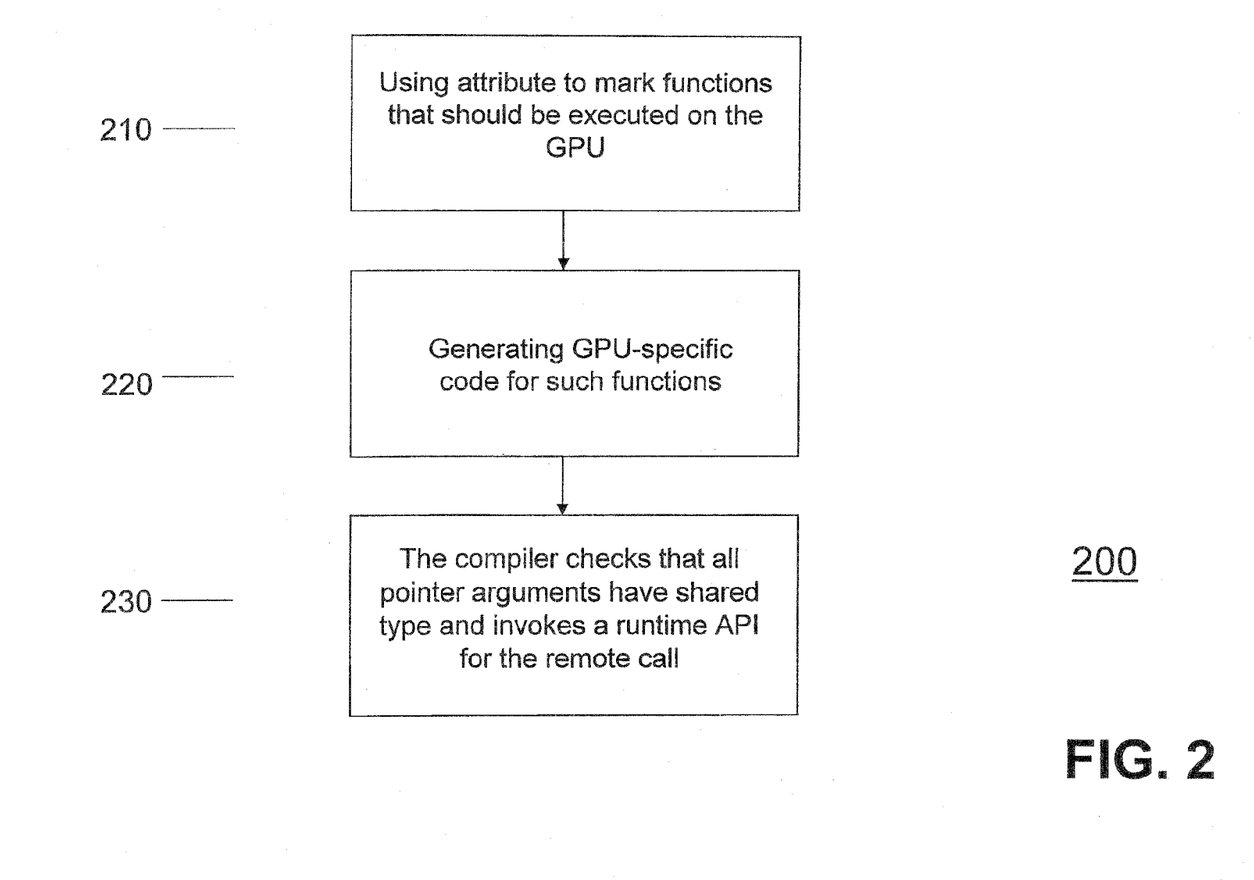
FIG. 2 is a flow chart for one embodiment of language constructs.

FIG. 2 is a flow chart for one embodiment of language constructs. A sequence 200 may be implemented in firmware, software, or hardware. Software embodiments may be stored on a computer-readable medium such as an optical disk, a magnetic disk, or a semiconductor memory. An attribute, such as attribute (GPU), may be used to annotate functions that should be executed on the GPU (block 210). For such functions, the compiler generates GPU-specific code (block 220). When a non-annotated function calls a GPU annotated function, it implies a call from the CPU to GPU. The compiler checks that all pointer arguments have shared type and invokes a runtime API for the remote call (block 230).

Function pointer types are also annotated with the attribute notation implying that they point to functions that are executed on GPU. Non annotated function pointer types point to functions that execute on the CPU. The compiler checks type equivalence during an assignment—for example, a function pointer with the GPU attribute may be assigned the address of a GPU annotated function.

Figure 3:
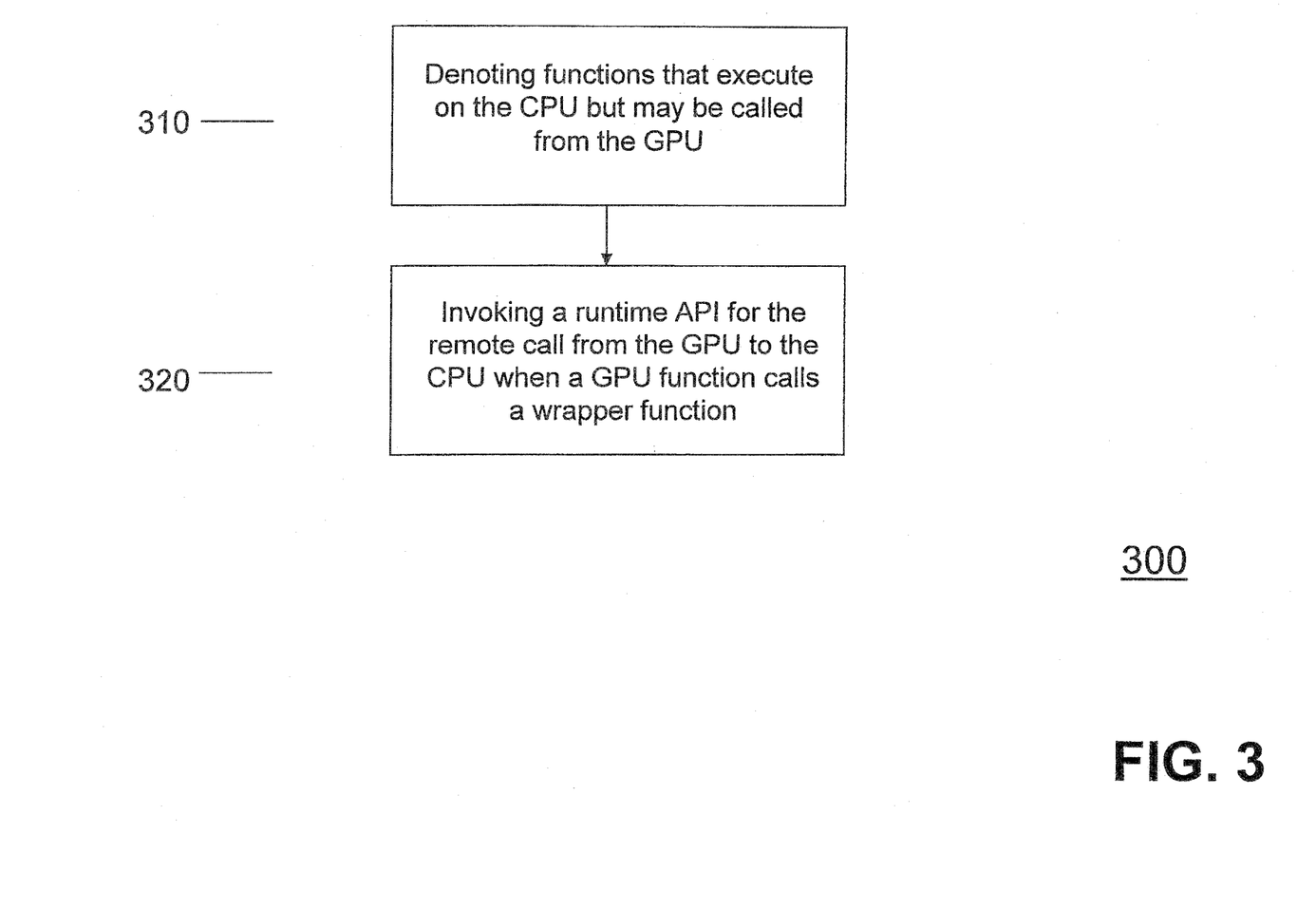
FIG. 3 is a flow chart for another embodiment of language constructs.

FIG. 3 is a flow chart for another embodiment of language constructs. A sequence 300 may be implemented in firmware, software, or hardware. A construct denotes functions that execute on the CPU but may be called from the GPU (block 310). These functions may be denoted using (_attribute (wrapper)). When a GPU function calls a wrapper function, the compiler may invoke a runtime API for the remote call from the GPU to the CPU (block 320). Making the GPU to CPU calls explicit may have the advantage that the compiler checks that any pointer arguments have the shared type. Moreover, this may be also important to deal with OS heterogeneity.

Data Annotation Rules

In one embodiment, data annotation rules may be as follows:

1. Shared may be used to qualify the type of variables with global storage. Shared may not be used to qualify a variable with automatic storage unless it qualifies a pointer's referenced type.

2. Pointer in private space may point to any space. Pointer in shared space may only point to shared space but not to private space.

The following rules may be applied to pointer manipulations:

1. Binary operator (+, −, , ==, !=, >, <, >=, <= . . . ) is only allowed between two pointers pointing to same space.

When an integer type expression is added to or subtracted from a pointer, the result has the same type as the pointer.
2. Assignment/casting from pointer-to-shared to pointer-to-private is allowed. If a type is not annotated assume that it denotes a private object. This makes it difficult to pass shared objects to legacy functions since their signature requires private objects. The cast allows avoiding copying between private and shared spaces when passing shared data to a legacy function.
3. Assignment/casting from pointer-to-private to pointer-to-shared is allowed only through a dynamic_cast. The dynamic_cast checks at runtime that the pointer-to-shared actually points to shared space. If the check fails, an error is thrown and the user has to explicitly copy the data from private space to shared space. With this capability, code may efficiently get return value from legacy functions.

Embodiments of the language allow casting between the two spaces, with possibly a dynamic check, since the data representation remains the same regardless of whether the data is in shared or private space. Even pointers may have the same representation regardless of whether they are pointing to private or shared space. Given any virtual address V in the shared address window, both CPU and GPU have their own local physical address corresponding to this virtual address. Pointers on CPU and GPU read from this local copy of the address, and the local copies get synced up as required by the memory model. This ability to cast pointers has been critical to porting workloads to the system since it allows easy interoperability with legacy code.

Not Qualifying Single Member of Aggregate Type:

Shared may not be used to qualify a single member of a structure or union unless it qualifies a pointer's referenced type. A structure or union type may have the shared qualifier which then requires all fields to have the shared qualifier as well.

Implementation

In one embodiment, two pragmas may be used to annotate function declarations:
  #pragma GPU may be used to annotate functions that can be executed on the GPU. The compiler generates GPU code for all such functions that are then loaded on the GPU.
  #pragma wrapper may be used to annotate functions that are executed on the CPU, but may be called from the GPU.

One embodiment of a compilation scheme may include as follows:
  A #pragma GPU function called from a non-GPU function (ie non annotated function) results in a call into GPU to execute the function. The compiler inserts the appropriate runtime API call.
  A #pragma GPU function is not allowed to call a non-annotated function
  A #pragma GPU function calling into a #pragma wrapper function results in a call from the GPU to the CPU. The compiler inserts the appropriate runtime API call.
  A #pragma wrapper function is not allowed to call into a #pragma GPU function.
  Any pointer parameter to a CPU or wrapper function has the shared type annotation.

The pragma declarations are part of the type of a function and hence also accompany the type declaration for a function pointer. The compiler checks at every function pointer assignment that the type of the rvalue is the same as the type of the lvalue (after factoring in the pragma declarations).

Embodiments of the invention may support calling preexisting binaries (from GPU) in the following way. Suppose the user wants to call the precompiled library Foo(int arg) from a GPU function. The user simply needs to write a wrapper (say #pragma wrapper FooWrapper (shared int arg1)). Within this wrapper function it calls the original function Foo and passes it the argument arg1. The compiler will copy the argument into the shared area, and make a call from the GPU to the CPU)

```
#pragma GPU imageKernel( ...) {
    x = strlen(char* s);          // suppose we want to
use a preexisting string library function in new GPU code
    }
```

The user writes:

```
#pragma wrapper int strlenWrapper(shared char* str);
#pragma GPU imageKernel( ... ) {
    arg = copyToShared(s);        // copies from private
to shared space
    x = strlenWrapper(arg);       // compiler typechecks
and inserts the runtime API call for CPU code
    }
}
// This code is part of the application running on
the CPU
#pragma wrapper int strlenWrapper(shared char* s) {
    return (strlen(s));
    }
```

The main difficulty in implementing the above is that the GPU and CPU have different address spaces and different linker and loader. The application code may be loaded at different addresses in the CPU and GPU address domains. Hence when there is a function call from the CPU to GPU, unlike an ordinary function call, the compiled code on the CPU does not know the address of the target. For example, on a GPU function call from a non annotated function (i.e. calling a GPU function from a CPU function), the compiler/linker/loader on the CPU side does not know the address of the target on the GPU side. Hence it may be impossible for the compiler to generate the proper call address.

Embodiments of the invention address this by creating a fat binary that contains both the GPU code and the CPU code. The binary is then loaded into both the CPU and GPU spaces. As mentioned before, the functions may be at different offsets in the two binaries since they may end up being loaded at different addresses. Further when a GPU or wrapper function is compiled, the name of the function is stored at a fixed offset from the beginning of the function (for example just before the code for the function).

Both on the GPU and the CPU side a table of function names and addresses is maintained. When a remote call is made from one side to the other, instead of generating an address to call, the compiler sends the name of the function to call and a search is performed in the jump table. When the application is loaded, the table is populated. For each #pragma wrapper function, the compiler generates a call into a registration function on the CPU side. For each #pragma GPU function, the compiler generates a call into the registration function on the GPU side. These registration functions take the runtime address of the corresponding function and populate the table with the name and the address.

At a remote call, the name in the table is accessed, the corresponding address obtained and the dispatch performed.

In some embodiments, the above method may not work for function pointers since the compiler can not associate a name with the function pointer call. All it has is a dynamic address. At runtime this address may be used to look up the name of the function (since the name is stored at a fixed offset). The name can then be sent as part of the remote call, the table lookup performed (as in the direct function call) and then dispatched to the function in question.

One embodiment of the pseudo code for the mechanism is shown below:

Step 1: Registration Functions with <funcName, funcPointer>

For each #pragma GPU function

```
registerGPUFunc(funcName, funcPointer) {
    if GPU:
        addToJumpTable(funcName, funcPointer);
    else //store in fixed offset, e.g.
    before the func code
        storeFuncNameByFuncPointer(funcName,
    funcPointer);
}
```

For each #pragma wrapper function:

```
registerWrapperFunc(funcName, funcPointer) {
    if CPU:
        addToJumpTable(funcName, funcPointer);
    else //store in fixed offset, e.g. before the
    func code
        storeFuncNameByFuncPointer(funcName,
    funcPointer);
}
```

Step 2: Transform Remote Call:

For each GPU_function call in CPU side and wrapper_function call in CPU side:

```
remoteCallByName(funcName, funcParas) {
    sendFuncNameToRemote(funcName, funcParas);
}
```

For each GPU_function pointer call in CPU side and wrapper_function pointer call on GPU:

```
remoteCallByPointer(funPointer, funcParas) {
    funcName =
    getFuncNameByFuncPointer(funcPointer);
        sendFuncNameToRemote(funcName, funcParas);
}
```

Step 3: Call the Function when Receiving a Remote Call Request:

```
executeRemoteCall(funcName, funcParas) {
    funcPointer = lookupJumpTable(funcName);
    dispatchFunc(funcPointer, funcParas);
}
```

Implementing Remote Calls

In one embodiment, a remote call from the CPU to GPU, or GPU to CPU may be complicated by the fact that the two processors have different operating systems and different loaders. The two binaries are also loaded separately and asynchronously. Suppose that the CPU code makes some calls into the GPU. When the CPU binary is loaded, the GPU binary has still not been loaded and hence the addresses for GPU functions are still not known. Therefore, the OS loader may not patch up the references to GPU functions in the CPU binary. Similarly, when the GPU binary is being loaded, the GPU loader does not know the addresses of any CPU functions being called from GPU code and hence may not patch those addresses.

Figure 4:
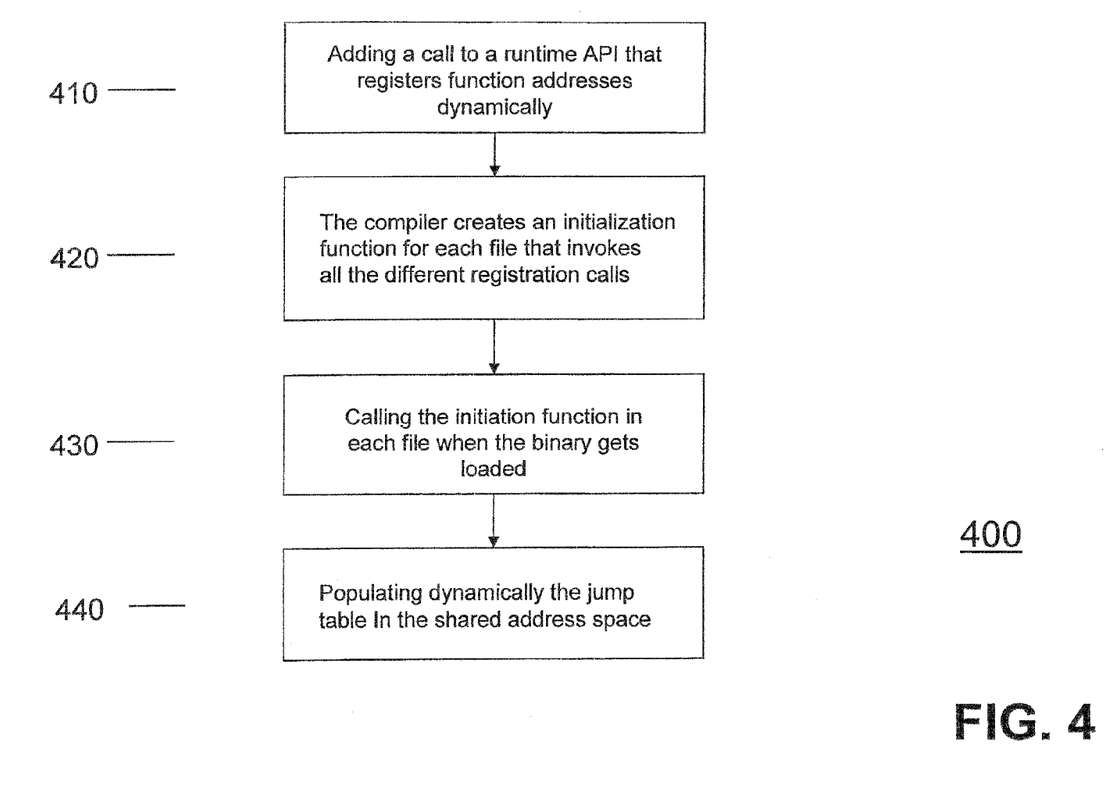
FIG. 4 is a flow chart of an embodiment for implementing remote calls.

FIG. 4 is a flow chart of an embodiment for implementing remote calls. A sequence 400 may be implemented in firmware, software, or hardware. In one embodiment, remote calls may be implemented by using a combination of compiler and runtime techniques. The language rules ensure that any function involved in remote calls (GPU or wrapper attribute functions) is annotated by the user. When compiling such functions, the compiler adds a call to a runtime API that registers function addresses dynamically (block 410). The compiler creates an initialization function for each file that invokes all the different registration calls (block 420). When the binary gets loaded, the initialization function in each file gets called (block 430). The shared address space contains a jump table that is populated dynamically by the registration function (block 440). The table contains one slot for every annotated function. The format of every slot is <funcName, funcAddr> where funcName is a literal string of the function name and funcAddr is the runtime address of the function.

Figure 5:
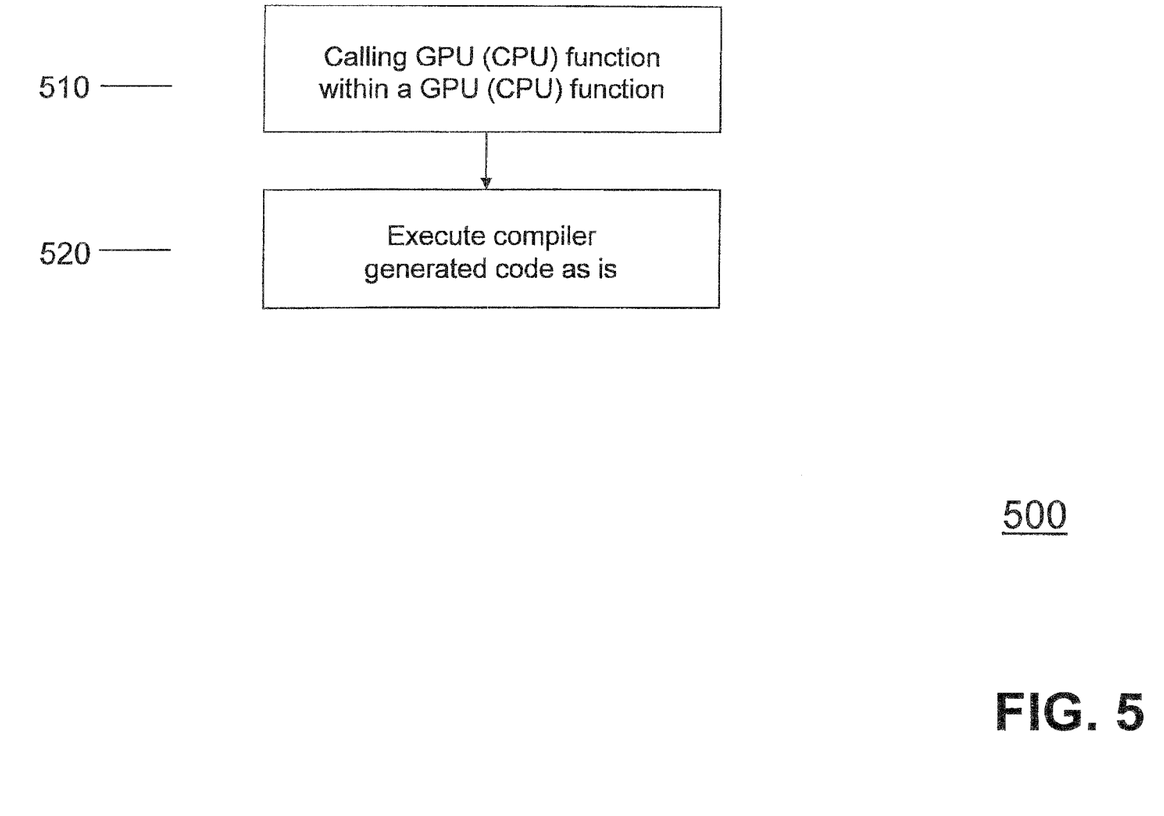
FIG. 5 is a flow chart of an embodiment of a translation scheme.
Figure 6:
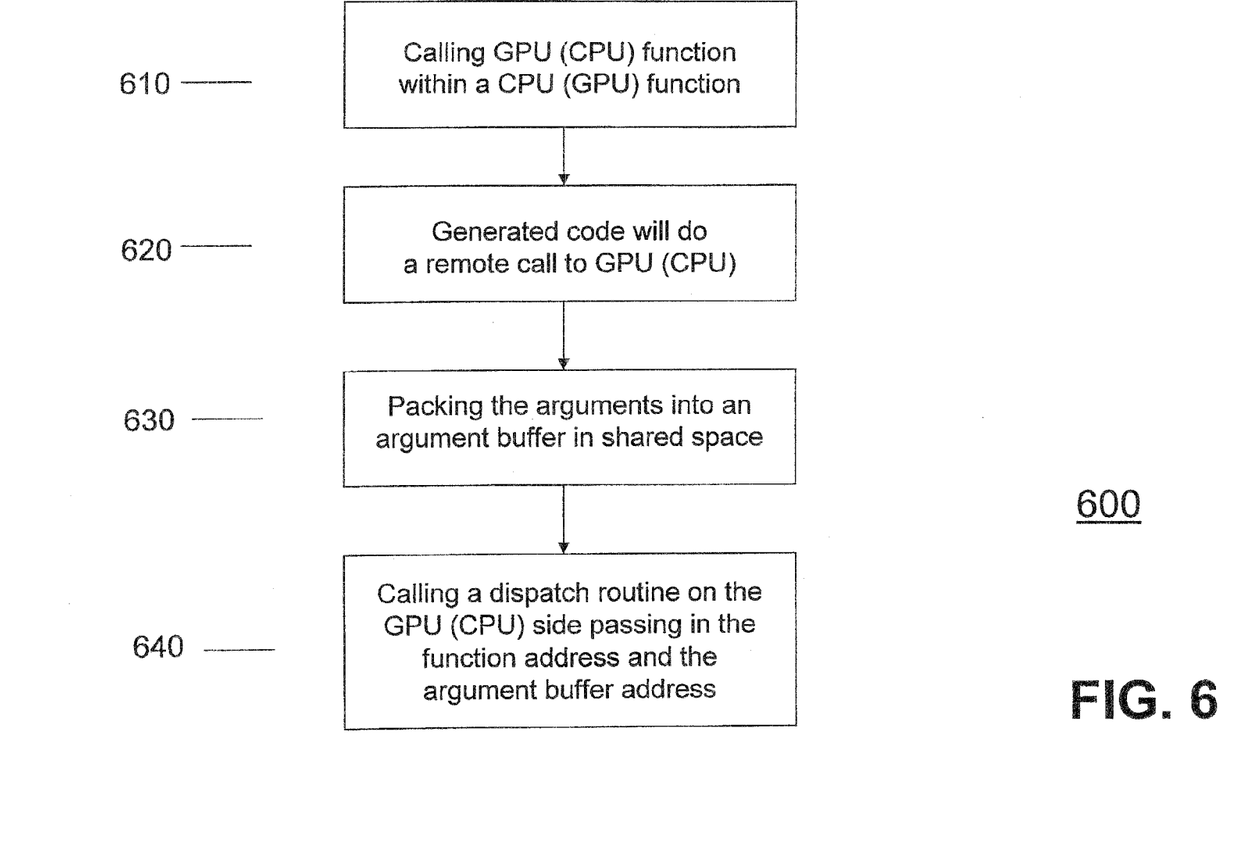
FIG. 6 is a flow chart of another embodiment of a translation scheme.

FIGS. 5 and 6 are flow charts of embodiments of a translation scheme. Sequences 500 and 600 may be implemented in firmware, software, or hardware. In accordance with one embodiment, the translation scheme may work as follows.

1. If a GPU (CPU) function is being called within a GPU (CPU) function (block 510), the compiler generated code will do the call as is (block 520).

2. If a GPU function is being called within a CPU function (block 610), the compiler generated code will do a remote call to GPU:

2.1. The compiler generated code will look up the jump table with the function name and obtain the function address (block 620).

2.2. The generated code will pack the arguments into an argument buffer in shared space (block 630). It will then call a dispatch routine on the GPU side passing in the function address and the argument buffer address (block 640).

There is similar process for a wrapper function except that it is a remote call to CPU if a wrapper function is called in a GPU function.

Figure 7:
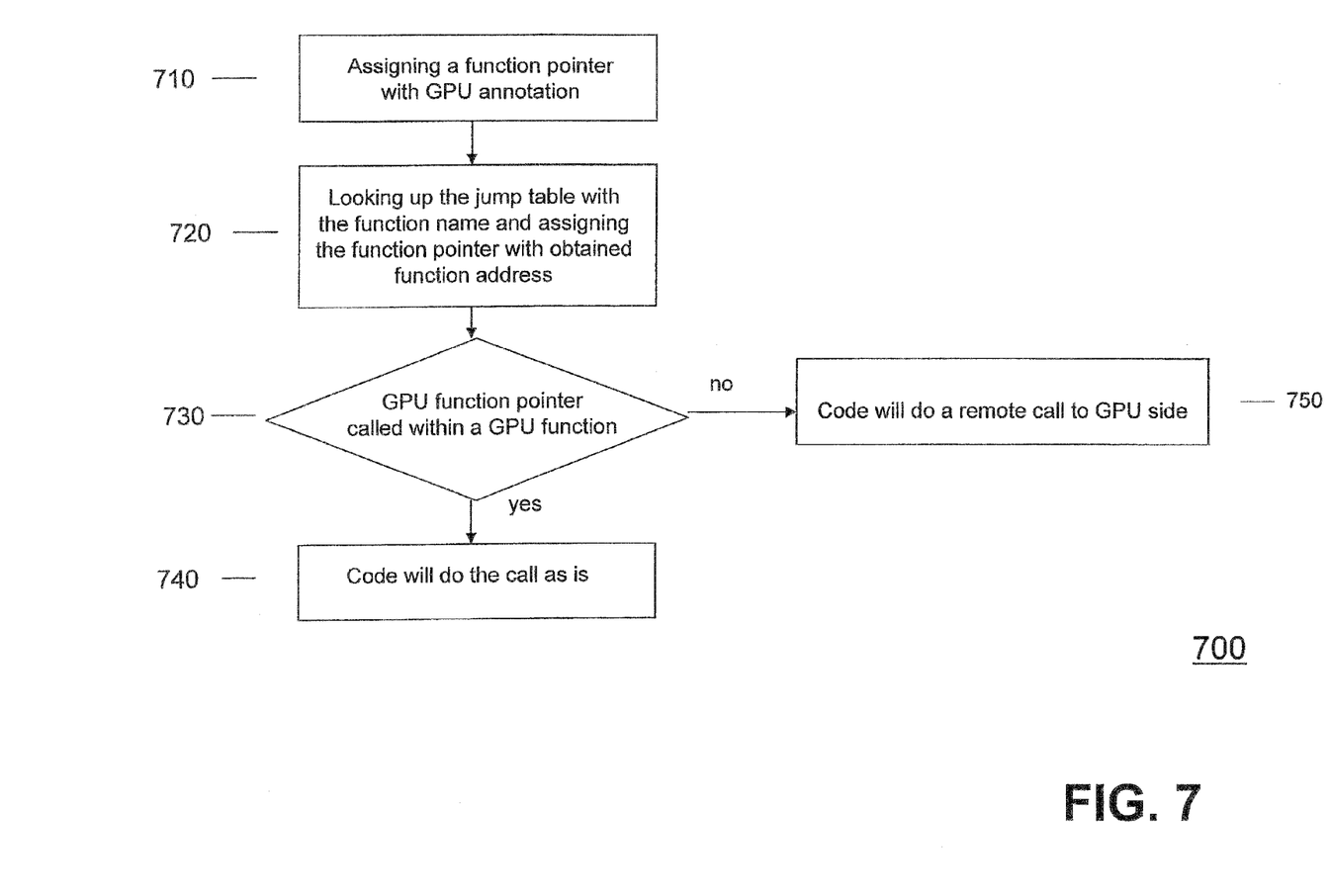
FIG. 7 is a flow chart of an embodiment for function pointer invocations.

FIG. 7 is a flow chart of an embodiment for function pointer invocations. A sequence 700 may be implemented in firmware, software, or hardware. For function pointer invocations, the translation scheme may work as follows. When a function pointer with GPU annotation is assigned (block 710), the compiler generated code will look up the jump table with the function name and assign the function pointer with obtained function address (block 720). Although the lookup may be optimized out when GPU annotated function pointer is assigned within GPU code, the optimization may be forsaken to use a single strategy for all function pointer assignments. If a GPU function pointer is being called within a GPU function (block 730), the compiler generated code will do the call as is (block 740). If a GPU function pointer is being called within a CPU function (block 730), the compiler generated code will do a remote call to GPU side (block 750). The process is similar for a wrapper function pointer except that there is a remote call to CPU side if wrapper function pointer is called in a GPU function.

The CPU-GPU signaling happens with task queues in the PCI aperture space. Daemon threads on both sides poll their respective task queues and when they find an entry in the task queue, they spawn a new thread to invoke the corresponding function. In one embodiment, the API for remote invocations is described below.

```
/* remote calls. The function type and arg types
encapsulate the function pointer and arguments. */
RPCHandler callRemote(myoFunctionType, MyoRPCArgType);
int resultReady(MyoRPCHandler);
MyoType getResult(MyoRPCHandler);
```

Code Example

This section illustrates one embodiment of the proposed programming model through a code example that illustrates a simple, vector addition (addTwoVectors) that may be accelerated through the GPU.

```
int addTwoVectors(int* a, int* b, int* c)
{
    for (i = 1 to 64) {
        c[i] = a[i] + b[i]
    }
}
int someApp( ...)
{
    int *a = malloc ( . . ); int *b = malloc ( . . ); int *c
= malloc ( . . );
    for (i = 1 to 64) {a[i] = ; b[i] = ; c[i] =;} //
initialize
    addTwoVectors(a, b, c);
    ...
}
```

In the embodiment of the programming model, this would be written as:

```
_attribute(GPU) int addTwoVectors(shared int* a,
shared int* b, shared int* c)
{
    for (i = 1 to 64) {
        c[i] = a[i] + b[i];
    }
}
int someApp( . . )
{
    shared int* a = sharedMalloc ( . . ); //allocate in
shared region
    shared int* b = sharedMalloc ( . . ); //allocate in
shared region
    shared int* c = sharedMalloc ( . . ); //allocate in
shared region
    for (i = 1 to 64) {a[i] = ; b[i] = ; c[i] =;} //
initialize
    addTwoVectors(a, b, c); // compiler converts
into remote call
    ...
}
```

In the above implementation, arrays a, b, c are allocated in shared space by calling the special malloc function. The remote call (addTwoVectors) acts as the release/acquire point and causes the memory region to be synced up between CPU & GPU.

One embodiment of a corresponding CUDA code snippet is presented below. Note that the user has to explicitly allocate the CPU and GPU memory spaces and copy the data from one side to the other. Note also that if these were more complex pointer containing data structures, a simple memcpy would not be sufficient to transfer the data from one side to the other. Instead, explicit marshalling would be needed.

```
int someApp(..)
{
    int* a = malloc ( . . ); // allocate in CPU memory
    int* b = malloc ( . . ); // allocate in CPU memory
    int* c = malloc ( . . ); // allocate in CPU memory
    int *aD, *bD, *cD; // arrays for the GPU devices
    for (i = 1 to 64) {a[i] = ; b[i] = ; c[i] =;} = ; //
initialize
    cudaMalloc(aD); // allocate space on GPU
    cudaMalloc(bD); // allocate space on GPU
    cudaMalloc(cD); // allocate space on GPU
    cudaMemcpy(aD, a, ..., cudaMemcpyHostToDevice); //
copy a
    cudaMemcpy(bD, b, ..., cudaMemcpyHostToDevice); //
copy b
    addTwoVectors << ... >> ( . . ) // do the GPU
computation
    cudaMemcpy(c, cD, ..., cudeMemcpyDeviceToHost); //
copy c
    ...
}
```

Embodiments of the invention may be implemented in a processor-based system that may include a general-purpose processor coupled to a chipset in one embodiment. The chipset may be coupled to a system memory and a graphics processor. The graphics processor may be coupled to a frame buffer, in turn coupled to a display. In one embodiment, the embodiments of the invention shown in FIGS. 1-7 may be implemented as software stored in a computer-readable medium, such as the system memory. However, embodiments of the present invention may be also implemented in hardware or firmware.

CONCLUSION

Embodiments of the programming model provide a shared memory model including language constructs for CPU-GPU platforms which enables fine-grain concurrency between the CPU and GPU. The uniform programming model may be implemented for both discrete and integrated configurations as well as for multi-GPU and hybrid configurations. User annotations may be used to demarcate code for CPU and GPU execution. User level communication may be provided between the CPU and GPU thus eliminating the overhead of OS driver calls. A full software stack may be implemented for the programming model including compiler and runtime support.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A computing system comprising:
   a central processing unit (CPU);
   a graphics processing unit (GPU);
   a memory; and
   circuitry configured to:
      allow pointers to be passed and data structures to be shared between the CPU and GPU;
      permit sharing of a sub-section of virtual address space in the memory between the CPU and the GPU, wherein:
      in response to a GPU function including a call to a GPU function, cause performance of the call;
      in response to a CPU function including a call to a GPU function, cause issuance of a remote call for performance by the GPU;
      in response to a CPU function including a call to another CPU function, cause performance of the call; and
      in response to a GPU function including a call to a CPU function, cause issuance of a remote call for performance by the CPU.

2. The system of claim 1, further comprising:
   in response to issuance of a remote call for performance by the GPU, buffer an instruction for performance by the GPU.

3. The system of claim 1, further comprising:
   in response to issuance of a remote call for performance by the CPU, buffer an instruction for performance by the CPU.

4. The system of claim 1, wherein code that includes any call can be flexibly executed on both the CPU and GPU.

5. The system of claim 4, wherein an attribute in the code is to indicate a function that is to be executed by the CPU or GPU.

6. The system of claim 1, wherein issuance of a remote call for performance by the CPU comprises invocation of a runtime API for the remote call.

7. The system of claim 1, wherein issuance of a remote call for performance by the GPU comprises invocation of a runtime API for the remote call.

8. The system of claim 1, wherein the issuance of a remote call to the GPU comprises:
   execution of compiler generated code to:
      look up a jump table with a function name and obtain the function address;
      pack arguments into an argument buffer in shared space between CPU and GPU; and
      call a dispatch routine on the GPU side and pass the function address and argument buffer address.

9. The system of claim 1, wherein the issuance of a remote call to the CPU comprises:
   execution of compiler generated code to:
      look up a jump table with a function name and obtain the function address;
      pack arguments into an argument buffer in shared space between CPU and GPU; and
      all a dispatch routine on the CPU side and pass the function address and argument buffer address.

10. The system of claim 1, further comprising a frame buffer communicatively coupled to the GPU and a display communicatively coupled to the frame buffer.

11. A method comprising:
    allowing pointers to be passed and data structures to be shared between a central processing unit (CPU) and a graphics processing unit (GPU);
    sharing of a sub-section of virtual address space between the CPU and the GPU;
    in response to a GPU function calling a GPU function, causing performance of the call;
    in response to a CPU function including a call to a GPU function, causing issuance of a remote call for performance by the GPU;
    in response to a CPU function calling another CPU function, causing performance of the call; and
    in response to a GPU function including a call to a CPU function, causing issuance of a remote call for performance by the CPU.

12. The method of claim 11, further comprising:
    in response to issuance of a remote call for performance by the GPU, buffering an instruction for performance by the GPU.

13. The method of claim 11, further comprising:
    in response to issuance of a remote call for performance by the CPU, buffering an instruction for performance by the CPU.

14. The method of claim 11, wherein code that includes any call can be flexibly executed on both the CPU and GPU.

15. The method of claim 14, wherein an attribute in the code is to indicate a function that is to be executed by the CPU or GPU.

16. The method of claim 11, wherein issuing a remote call comprises invoking a runtime API for the remote call.

17. At least one non-transitory computer readable medium storing instructions that, if executed, enable a processor-based system comprising a central processing unit (CPU) and a graphics processing unit (GPU) to:
    allow pointers to be passed and data structures to be shared between a CPU and GPU;
    permit sharing of a sub-section of virtual address space in the memory between the CPU and the GPU;
    wherein:
       in response to a GPU function including a call to a GPU function, cause performance of the call;
       in response to a CPU function including a call to a GPU function, cause issuance of a remote call for performance by the GPU;
       in response to a CPU function including a call to another CPU function, cause performance of the call; and
       in response to a GPU function including a call to a CPU function, cause issuance of a remote call for performance by the CPU.

18. The medium of claim 17, further comprising stored instructions that, if executed, enable a processor-based system to:
    in response to issuance of a remote call for performance by the GPU, cause buffer of an instruction for performance by the GPU.

19. The medium of claim 17, further comprising stored instructions that, if executed, enable a processor-based system to:
    in response to issuance of a remote call for performance by the CPU, cause buffer of an instruction for performance by the CPU.

20. The medium of claim 17, wherein the instructions can be flexibly executed on the CPU or the GPU.

21. The medium of claim 20, wherein an attribute in the instructions is to indicate a function that is to be executed by the CPU or GPU.

22. The medium of claim 17, wherein issuance of a remote call for performance by the CPU comprises invocation of a runtime API for the remote call.

23. The medium of claim 17, wherein issuance of a remote call for performance by the GPU comprises invocation of a runtime API for the remote call.

24. The medium of claim 17, wherein the issuance of a remote call to the GPU comprises:
   execution of compiler generated code to:
      look up a jump table with a function name and obtain the function address;
      pack arguments into an argument buffer in shared space between CPU and GPU; and
      call a dispatch routine on the GPU side and pass the function address and argument buffer address.

25. The medium of claim 17, wherein the issuance of a remote call to the CPU comprises:
   execution of compiler generated code to:
      look up a jump table with a function name and obtain the function address;
      pack arguments into an argument buffer in shared space between CPU and GPU; and
      call a dispatch routine on the CPU side and pass the function address and argument buffer address.

26. The medium of claim 17, further comprising stored instructions that, if executed, enable a processor-based system to:
   offload a kernel to the GPU using CPU code; and
   use the kernel to call preexisting libraries on the CPU, or make other calls into CPU functions.

27. The medium of claim 17, further comprising stored instructions that, if executed, enable a processor-based system to:
   identify data that is shared between the CPU and GPU with a shared keyword;
   allocate global shared variables in a shared memory space; and
   provide a function to allocate data in the shared memory.

* * * * *